US006947824B1

(12) United States Patent
Livshiz et al.

(10) Patent No.: US 6,947,824 B1
(45) Date of Patent: Sep. 20, 2005

(54) ENGINE RPM AND TORQUE CONTROL TRANSITION

(75) Inventors: Michael Livshiz, Ann Arbor, MI (US); Scott J. Chynoweth, Fenton, MI (US); Todd R. Shupe, Milford, MI (US); Michael A. Kropinski, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/874,089

(22) Filed: Jun. 22, 2004

(51) Int. Cl.[7] .......................... F02D 41/16; G06F 19/00

(52) U.S. Cl. .................. 701/103; 701/110; 123/352; 123/361

(58) Field of Search ............................ 123/350, 352, 123/361, 399, 403; 701/101–105, 110; 73/117.3, 73/118.2

(56) References Cited

U.S. PATENT DOCUMENTS

| 4,789,939 | A | * | 12/1988 | Hamburg | 701/103 |
| 5,029,569 | A | * | 7/1991 | Cullen et al. | 123/494 |
| 6,305,350 | B1 | * | 10/2001 | Livshiz et al. | 123/352 |
| 6,363,316 | B1 | * | 3/2002 | Soliman et al. | 123/399 |
| 6,460,409 | B1 | * | 10/2002 | Soliman et al. | 73/118.2 |
| 6,704,638 | B2 | | 3/2004 | Livshiz et al. | |
| 6,718,822 | B2 | * | 4/2004 | Soliman et al. | 73/118.2 |
| 6,761,146 | B1 | * | 7/2004 | Livshiz et al. | 123/361 |

* cited by examiner

Primary Examiner—Willis R. Wolfe, Jr.
(74) Attorney, Agent, or Firm—Christopher DeVries

(57) ABSTRACT

Internal combustion engine control is generally in accordance with RPM and torque modes. Transition from RPM to torque control is accomplished by employing a mass airflow term accounting for any nonequivalence between RPM mode and torque mode mass airflows corresponding respectively to an RPM mode mass airflow and a closed-throttle mass airflow contribution to a total torque mode mass airflow.

12 Claims, 5 Drawing Sheets

ENGINE RPM AND TORQUE CONTROL TRANSITION

TECHNICAL FIELD

The present invention is related to automotive engine controls. More particularly, the invention is concerned with coordinating various modes of engine controls.

BACKGROUND OF THE INVENTION

Modern automotive engine controls rely predominantly upon two operating control modes. One control mode generally corresponds to engine speed (RPM) and is referred to herein as RPM mode control. Such control is characteristically invoked by minimal or no throttle pedal depression and is generally characterized by significantly throttled engine operation, e.g. low load engine idle. The other control mode (torque mode) generally corresponds to varying degrees of engine throttling in accordance with varying operator demands such as through throttle pedal depressions and vehicle cruise control settings. This latter mode also includes scenarios of controlled vehicle coastdown which indirectly limits the engine braking effect upon the vehicle by controlling the throttle angle subsequent to throttle pedal release by the operator or a canceled cruise setting, for example.

The controls for both such modes are known to provide a resultant desired mass airflow signal which is utilized by an airflow converter to establish throttle valve/idle air control valve commands as appropriate in accordance with the particular engine control hardware. In some engine systems a throttle valve alone provides idle air flow whereas in other systems an idle air control (IAC) valve provides a measure of throttle valve bypass airflow.

It is known to satisfactorily control the transition from torque mode to RPM mode. In mechanically linked throttle systems the throttle return to an idle position upon release of the accelerator pedal by the operator is damped. This improves coastdown feel for the operator and also prevents the engine from stalling, particularly under heavy loads conditions. In so called throttle follower systems, an IAC valve is open slightly at very low throttle angles and opens up more as the throttle opens up. In such systems, when throttle position decreases upon the release of the throttle pedal the IAC motor will close slowly to effect the desirable coastdown feel and anti-stall benefits described.

Typically in modern engine controls, a control command is periodically adjusted to provide for engine output torque requirement. Commonly, the control command is directed to an engine intake air rate control actuator, such as the throttle valve and IAC valve as the case may be, to vary engine intake air rate to achieve the output torque requirement during RPM and torque modes. Commonly, the torque requirement is established in accordance with stored calibration information resolved during a conventional calibration process from such engine parameters as intake manifold absolute pressure, engine speed, spark timing advance, air/fuel ratio, ambient temperature, engine coolant temperature, and barometric pressure.

There exists, however, certain torque discontinuities in the transition between RPM mode and torque mode. Such discontinuities may be result in noticeable driveline disturbances that are objectionable to the vehicle operator, engine speed sags, or throttle response characteristics which are not pleasing to the driver. Therefore, there is a need for an improved means of transitioning from RPM mode to torque mode.

SUMMARY OF THE INVENTION

In accordance with one implementation of the present invention, an internal combustion engine including an intake air throttle and an operator controlled throttle pedal is controlled by an engine controller in accordance with a torque control term during periods of RPM mode engine operation generally characterized by a substantially undepressed throttle pedal and during periods of torque mode engine operation characterized by a depressed throttle pedal. An RPM mode torque control term is provided to the engine controller for controlling the engine output in accordance therewith during periods of RPM mode engine operation. A torque mode torque control term for use in controlling the engine output in accordance therewith during periods of torque mode engine operation includes an operator requested portion, a closed-throttle portion and a transitional portion. The transitional portion is initialized as the difference between the closed-throttle portion and the last commanded RPM mode torque control term. Transitions from periods of RPM mode engine operation to periods of torque mode engine operation is effected by substituting the torque mode torque control term for the RPM mode torque control term in the engine controller, and controlling the engine output in accordance with the torque mode torque control term while gradually reducing the transitional portion of the torque mode torque control term.

In another implementation of the present invention, transitions from an RPM mode control to a torque mode control in an internal combustion engine controller includes interpreting an operator invoked torque request such as from a throttle pedal position into a first mass airflow and interpreting a closed-throttle torque request into a second mass airflow. A third mass airflow required for the engine to produce an output torque effective for maintaining engine speed (RPM) at a predetermined set speed is also determined. The mass airflow difference between the second mass airflow and third mass airflow is calculated. A torque mode mass airflow is determined as substantially equivalent to the summation of the first mass airflow, the second mass airflow and the mass airflow difference between the second mass airflow and third mass airflow. Switching from RPM mode control, wherein throttle position is determined in accordance with the third mass airflow, to a torque mode control, wherein throttle position is determined in accordance with the torque mode mass airflow can then be accomplished.

An article of manufacture in accordance with the present invention includes a storage medium having a computer program encoded therein for controlling an internal combustion engine, including an intake air throttle and an operator controlled throttle pedal, with an engine controller in accordance with a torque control term during periods of RPM mode engine operation characterized by a substantially undepressed throttle pedal and during periods of torque mode engine operation characterized by a depressed throttle pedal. The program includes: code for providing an RPM mode torque control term; code for controlling the engine output in accordance with the RPM mode torque control term during periods of RPM mode engine operation; code for calculating a torque mode torque control term comprising an operator requested portion, a closed-throttle portion and a transitional portion comprising the difference between the closed-throttle portion and the RPM mode torque control term; and, code for transitioning control from periods of RPM mode engine operation to periods of torque mode engine operation by substituting the torque mode torque control term for the RPM mode torque control term in the engine controller, controlling the engine output in accordance with the torque mode torque control term, and gradually reducing the transitional portion of the torque mode torque control term.

BRIEF DESCRIPTION OF THE DRAWINGS

The drawings are now referred to which are meant to be exemplary and not limiting, and wherein like elements are numbered alike in the several Figures.

DESCRIPTION OF THE PREFERRED EMBODIMENT

Figure 1:
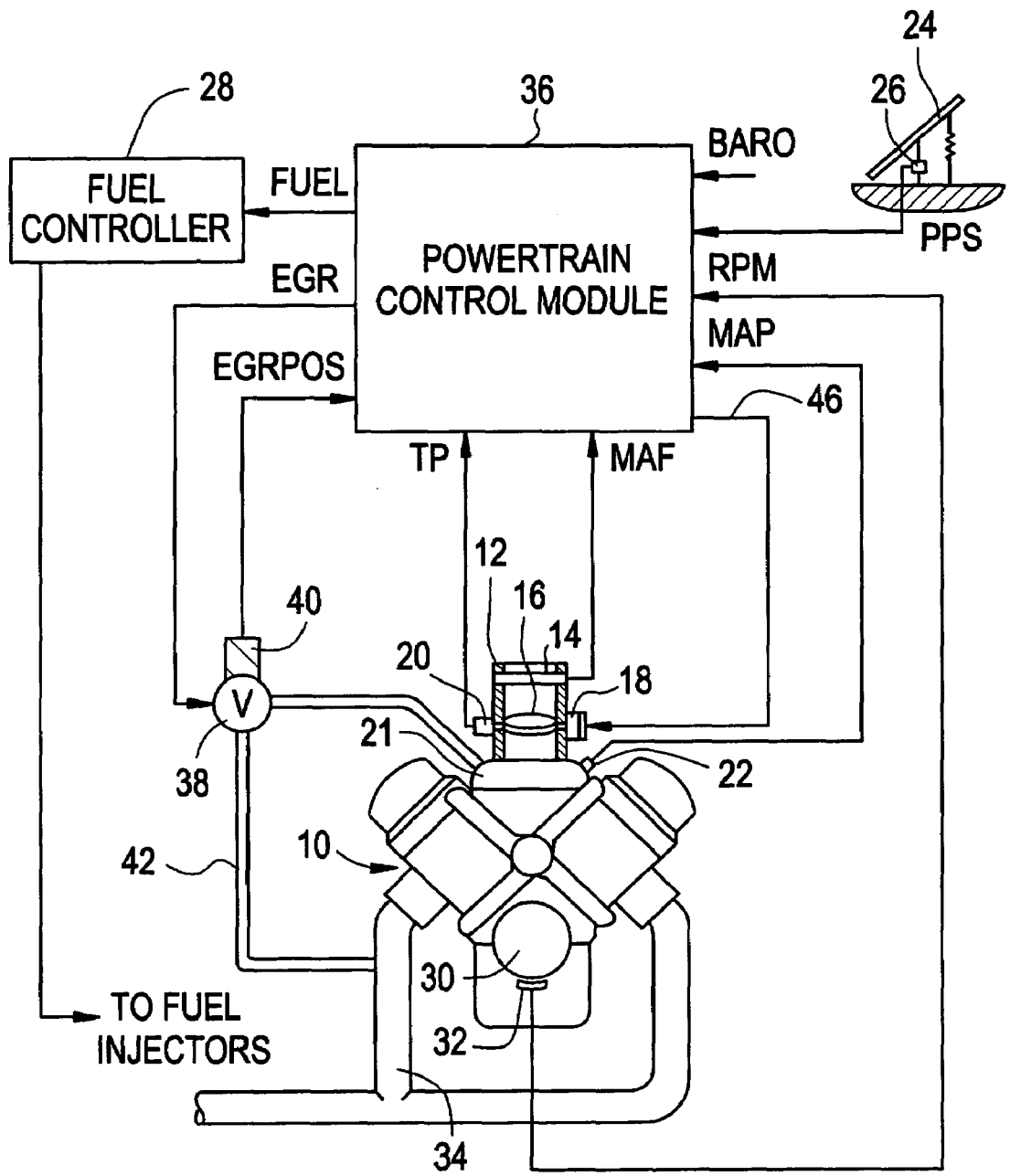
FIG. 1 is a schematic representation of an exemplary internal combustion engine system for illustrating a preferred embodiment of the present invention.

Referring to FIG. 1, a powertrain control module PCM 36 includes a microcontroller device of any conventional design with standard control and logic circuitry and standard memory devices including read only memory devices in which are stored a plurality of routines for carrying out engine control and diagnostic operations. Each routine includes a sequence of instructions which are executed by the microcontroller following reestablished engine events or on a timed basis. One such routine, which may be repeatedly executed following each successive engine cylinder event while the engine is operating is a fuel control routine for generating and issuing to fuel controller 28 a fuel command FUEL in the form of a pulse width corresponding to a desired fuel injector open time during which pressurized fuel is passed through the fuel injector for an active engine cylinder to provide for a desired engine cylinder air/fuel ratio. Command FUEL is processed by fuel controller 28 into a drive current which is applied to the fuel injector for an active engine cylinder (the cylinder about to undergo its compression stroke in a conventional homogeneous-charge, spark-ignition engine). As described, the injected fuel quantity is mixed with an inlet air quantity in an intake runner or directly in an engine cylinder and is ignited in the engine cylinder.

An operator-controlled accelerator pedal 24, a.k.a. throttle pedal, is manually depressed by a vehicle operator to indicate a desired engine operating level. The degree of depression of the pedal away from a rest or low angle position is transduced by conventional potentiometric position sensor 26 into output signal PPS, which is provided as a control input to PCM 36 as an indication of a desired engine operating level. An intake air valve position command is converted into an actuator drive current signal on line 46 for commanding output shaft of actuator 18 toward a desired rotational position. Intake air valve position signal TP is received by the PCM 36 for closed-loop control operations. Alternatively, a separate throttle control module (not shown) includes conventional controller architecture of such well-known elements as a central processing unit and input/output circuitry. Generally, the throttle control module receives engine operating condition information from the PCM 36 across a bi-directional serial data link, and receives transducer signals and generates, through execution of a series of stored instructions in the form of a control routine, an intake air valve position command (i.e. actuator drive current signal) for commanding output shaft of actuator 18 toward a desired rotational position. In such arrangement, signal TP is received by the throttle control module for closed-loop control operations.

Intake air is passed through intake air bore 12 past mass airflow meter 14 of the thick film or hot wire type for transducing engine intake air mass flow rate into output signal MAF. An electronically-controlled intake air valve 16, for example of the butterfly or rotary type, is disposed in intake air bore 12 and rotates therein to vary a degree of restrictiveness of the intake bore 12 to intake air passing therethrough. An electromechanical actuator 18, for example of the DC motor or stepper motor type, includes a rotatable output shaft (not shown) mechanically linked to the valve 16, such as through a gear assembly (not detailed). The rotational position of the output shaft of actuator 18 is controlled through variation in an electrical current command issued by PCM 36, for example through pulse width modulation control of the four gates of a commercially available full H-bridge (not shown) for bi-directional current control. Through timed variation in the magnitude of the current command, high resolution, highly responsive control of engine intake air valve position is provided for engine intake air rate control. Actuator 18 may be any commercially-available high performance electromechanical actuator that provides high performance dynamic positioning, as is well-established as required in electronic throttle control applications under certain engine operating conditions, such as high engine intake air rate (high engine load) operating conditions. The rotational position of the intake air valve 16 is transduced by potentiometric position sensor 20 of any conventional type into output signal TP.

The intake air passing across intake air valve 16 is received in an intake manifold 21 for distribution to intake runners of a plurality of engine cylinders (not shown). Intake air absolute pressure in the intake manifold 21 is transduced by conventional pressure transducer 22 into output signal MAP. Ambient barometric pressure is transduced by a conventional barometric pressure sensor (not shown) or, alternatively, under specified operating conditions, such as conditions in which the pressure drop across the intake air valve 16 is substantially zero, is set to the pressure value represented by signal MAP.

The intake air is combined with an injected fuel quantity and delivered to engine cylinders for combustion therein for reciprocally driving pistons (not shown) within the cylinders, the pistons being mechanically linked to an engine output shaft 30 to rotatably drive the output shaft. The rate of rotation of the output shaft 30 (i.e. engine speed) and is transduced by conventional Hall effect or variable reluctance transducer 32 positioned in close proximity to the output shaft to transduce passage of teeth or notches (not shown) formed on the output shaft into cycles of transducer output signal RPM. Gasses produced in engine cylinders during the combustion process are guided out of the cylinders and through exhaust gas conduit 34.

An exhaust gas recirculation conduit 42 opens, on a first end, into the exhaust gas conduit 34 and on a second end opposing the first end, into intake manifold 21 to provide for recirculation of exhaust gas from the exhaust gas conduit into the intake manifold to dilute engine intake air and thereby reduce oxygen content of the intake air and reduce combustion temperatures, consistent with generally recognized procedures to reduce the engine emissions component of oxides of nitrogen NOx. An EGR valve 38 of the electrically-controlled solenoid type is disposed in the recirculation conduit 42 and is responsive to control signal EGR for varying restriction to flow of exhaust gas through the conduit to provide for control of intake air charge dilution. Potentiometric position sensor 40 is associated with the valve 38 in such a manner that a movable sensing element such as a wiper arm moves with a pintle (not shown) of the valve 38 to vary sensor output signal EGRPOS which indicates the degree of restriction imposed by the controlled valve position.

The PCM 36 receives a plurality of input signals including the described transducer output signals EGRPOS, MAF, MAP, RPM, and BARO, and, through execution of the described routines, generates command FUEL, and other control commands including an ignition timing control command.

Among the powertrain control algorithms executed by PCM 36, various routines are executed once for each sensed engine cylinder event. In this context, a cylinder event may be defined as each cylinder torque producing event. Upon the occurrence of each cylinder event which may be indicated by each cycle of signal of RPM from sensor 32, present values are generated for a plurality of engine parameters including coolant temperature TEMP, engine speed RPM, manifold absolute pressure MAP, engine spark timing EST and engine air/fuel ratio AFR. As is generally understood in the art of engine control, the present spark timing value EST is determined in accord with a variety of conventional engine control goals including engine performance and emissions goals. Air/fuel ratio AFR is determined in response to an oxygen input signal (not shown) which provides an indication of actual engine air/fuel ratio.

Figure 2:
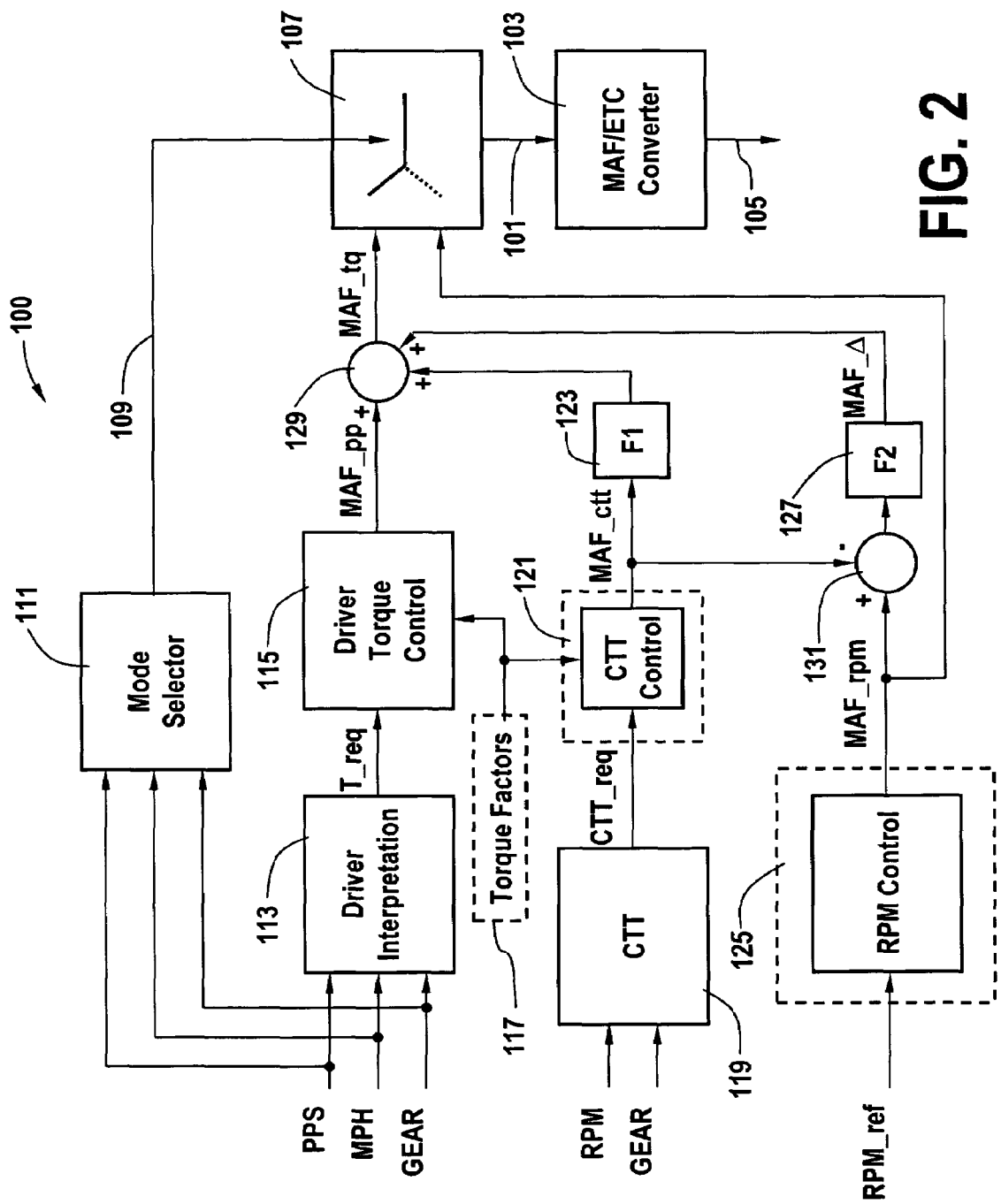
FIG. 2 is control block diagram illustrating a preferred embodiment of the method of the present invention.

With reference now to FIG. 2, a control block diagram illustrates an exemplary preferred control 100 for establishing engine output torque in accordance with the present invention. An objective of the control is to provide a final torque control signal 101 which is used in the engine control to establish engine output torque. Final torque control signal 101, in response to mode select signal on line 109 from mode select logic block 111, is selectively determined at selection block 107 as one of an RPM mode source (MAF_rpm) or a torque mode source (MAF_tq) as described at a later point herein. The preferred final torque control term takes the form of a requested mass airflow signal representing the amount of fresh intake air over time to be delivered to the engine cylinders as the fresh air portion of the cylinder charge. In the preferred embodiment, mass airflow signal is converted at block 103 to a throttle area signal for use in establishing the position command for the intake throttle valve. Converter block 103 relies on the well known compressible flow equation in establishing throttle area. For an exemplary eight cylinder engine, the relationship takes the following form:

$$\text{Area} = \frac{APC * RPM * \sqrt{R_{gas} * T}}{15 * B * \Phi\left(\frac{P}{B}\right)} \quad (1)$$

where:
APC is air per cylinder;
RPM is engine speed;
$R_{gas}$ is the universal gas constant;
T is intake air temperature;
B is barometric pressure;
P is manifold absolute pressure;
$\Phi$ is air density factor; and
15 is a constant for V8 engine.

Mode select logic block 111 has as exemplary inputs signal PPS indicative of throttle position, vehicle speed signal MPH from conventional output member speed or wheel speed sensors (not separately illustrated) and current transmission speed ratio GEAR. These same signals—PPS, MPH and GEAR—also are provided as inputs to driver interpretation block 113 described at a later point herein. Mode select logic block 111 is adapted to provide mode select signal on line 109 in response to various combinations of the signals PPS, MPH and GEAR. For example, GEAR signal indicating engine/transmission torque decoupled operation, e.g. park/neutral, vehicle speed signal indicating substantially zero vehicle speed, and PPS signal indicating minimally depressed or undepressed throttle pedal all tend to weigh in favor of RPM mode control and selection of RPM mode source MAF_rpm for final torque control signal 101. But GEAR signal indicating drive and reverse gear selections, vehicle speed signal MPH indicating non-zero vehicle speed, and PPS signal indicating definitive depression of throttle pedal all tend to weigh in favor of torque mode control and selection of torque mode source MAF_tq for final torque control signal 101.

Driver interpretation block 113 as previously mentioned preferably shares the same input signals PPS, MPH and GEAR as utilized by mode select logic block 111. Block 113 responds to these inputs and resolves an appropriate throttle torque request signal T_req therefrom. Such determinations are generally well known in the art and may include operator selectable driving modes, e.g. performance, economy, winter, etc., and may further include adaptively learned driving habits to tailor the response to a particular driver's style. The throttle torque request signal T_req is provided to driver torque control block 115 which determines in accordance with a plurality of predetermined torque affecting engine parameters 117 a mass airflow (MAF_pp) required to produce the throttle torque requested by the operator as represented by T_req. Torque affecting engine parameters 117 may be selected from such parameters as engine speed RPM, spark timing EST, exhaust gas recirculation EGR, engine coolant temperature TEMP, barometric pressure BARO, air/fuel ratio AFR and manifold absolute pressure MAP. Driver torque control block 115 functionality is generally well known in the art of so-called torque-based engine controls and is implemented in a torque model represented by stored calibration data sets derived through well-known multi-dimensional dynamometer experiments for the specific engine being controlled. Such torque modeling as a functional combination of generally-known engine parameters is well-known in the art. Mass airflow MAF_pp is provided to summing node 129 as the operator requested contribution to torque mode mass airflow MAF_tq.

Figure 3:
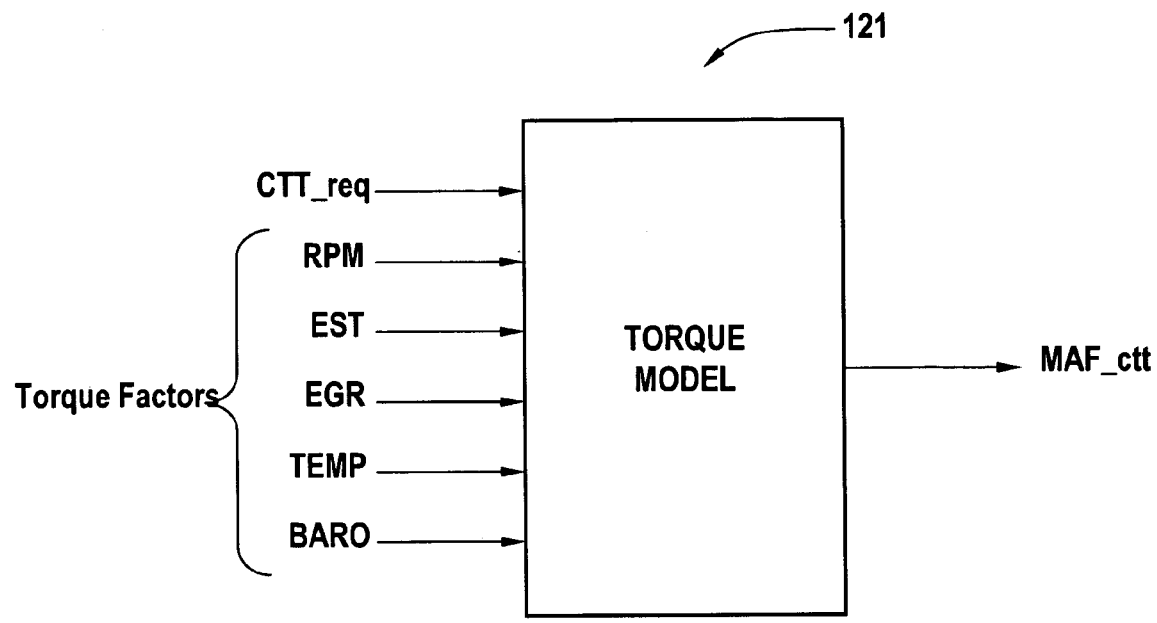
FIG. 3 is a block diagram of an exemplary torque model for determining a closed-throttle torque as shown in the control block diagram of FIG. 2.

Closed-throttle torque (CTT) block 119 has inputs of engine speed RPM and current transmission speed ratio GEAR. Block 119 responds to these inputs and resolves an appropriate closed-throttle torque request signal CTT_req therefrom. CTT_req represents a minimum engine torque required to maintain engine operation in accordance with the considered powertrain operating parameters RPM and GEAR. The closed-throttle torque request signal CTT_req is provided to CTT control block 121 which determines in accordance with a plurality of predetermined torque affecting engine parameters 117 a mass airflow (MAF_ctt) required to produce the closed-throttle torque requested as represented by CTT_req. Torque affecting engine parameters 117 may be selected from such parameters as engine speed RPM, spark timing EST, exhaust gas recirculation EGR, engine coolant temperature TEMP, barometric pressure BARO, air/fuel ratio AFR and manifold absolute pressure MAP. CTT control block 121 is implemented as an inverse torque model represented by stored calibration data sets derived through well-known multi-dimensional dynamometer experiments for the specific engine being controlled. Additional detail of a preferred control block including preferred inputs is illustrated in FIG. 3. An exemplary torque model which will be recognizable by one having ordinary skill in the art as adaptable for inverse application in obtaining mass airflow in accordance with a torque request is set forth in detail in commonly assigned U.S. Pat. No. 6,704,638 B2, the contents of which are herein incorporated by reference. Preferably, as shown in FIG. 2, the closed-throttle mass airflow MAF_ctt is filtered at F1 123. The filtered CTT mass airflow MAF_ctt is then provided to summing node 129 as the closed-throttle contribution to torque mode mass airflow MAF_tq.

Figure 4:
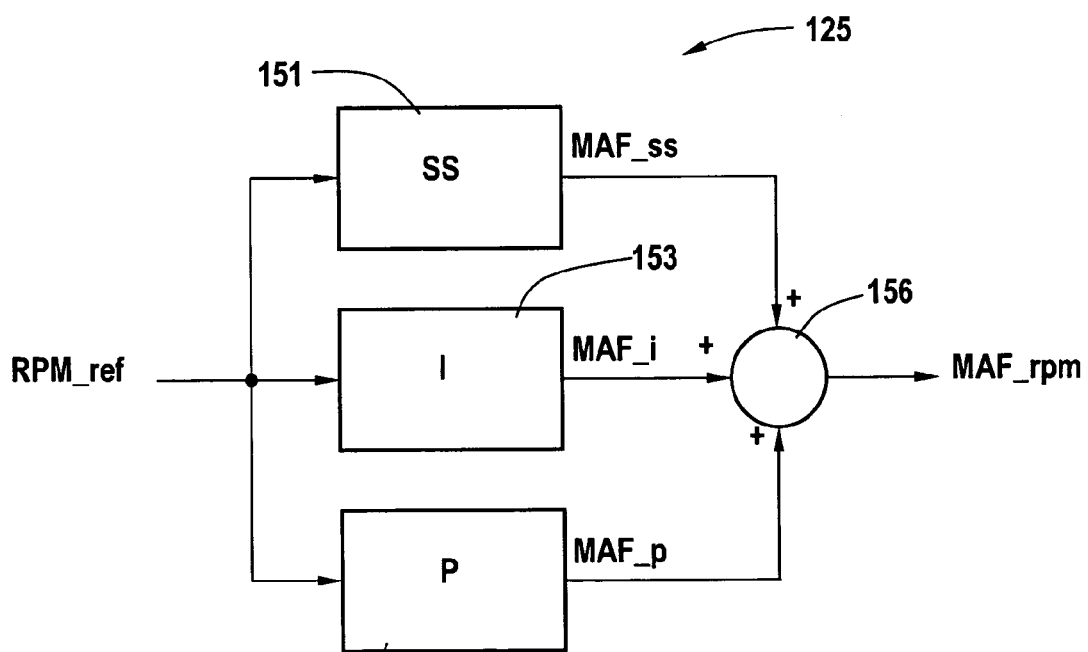
FIG. 4 is a block diagram of an exemplary RPM mode torque control term generator as shown in the control block diagram of FIG. 2.

RPM control block 125 has an input of a reference engine speed or set speed RPM_ref. Preferably, RPM control block 125 is a closed loop PI control including an engine speed feedback input (not separately illustrated). RPM control block 125 determines a mass airflow (MAF_rpm) required to maintain the engine speed at the set speed RPM_ref. With reference to FIG. 4, a block diagram of a RPM control block implemented as a closed loop PI control is illustrated. RPM control block 125 includes an open loop steady state block SS 151 and closed loop integral I and proportional P blocks 153 and 155, respectively. Each block SS, I and P provides a respective output in mass airflow terms which are then summed at node 156. MAF_rpm is then applied to selection block 107 as the RPM mode mass airflow input thereto in addition to the torque mode mass airflow MAF_tq.

Closed-throttle mass airflow MAF_ctt and RPM mass airflow MAF_rpm are combined at node 131 to determine therefrom the mass airflow difference therebetween. This difference is then applied to integrator F2 127 effective to control the rate of decay thereof as described in further detail with respect to FIG. 5. The resultant filtered mass airflow difference MAF_Δ is then provided to summing node 129 as the transitional contribution to torque mode mass airflow MAF_tq.

Figure 5:
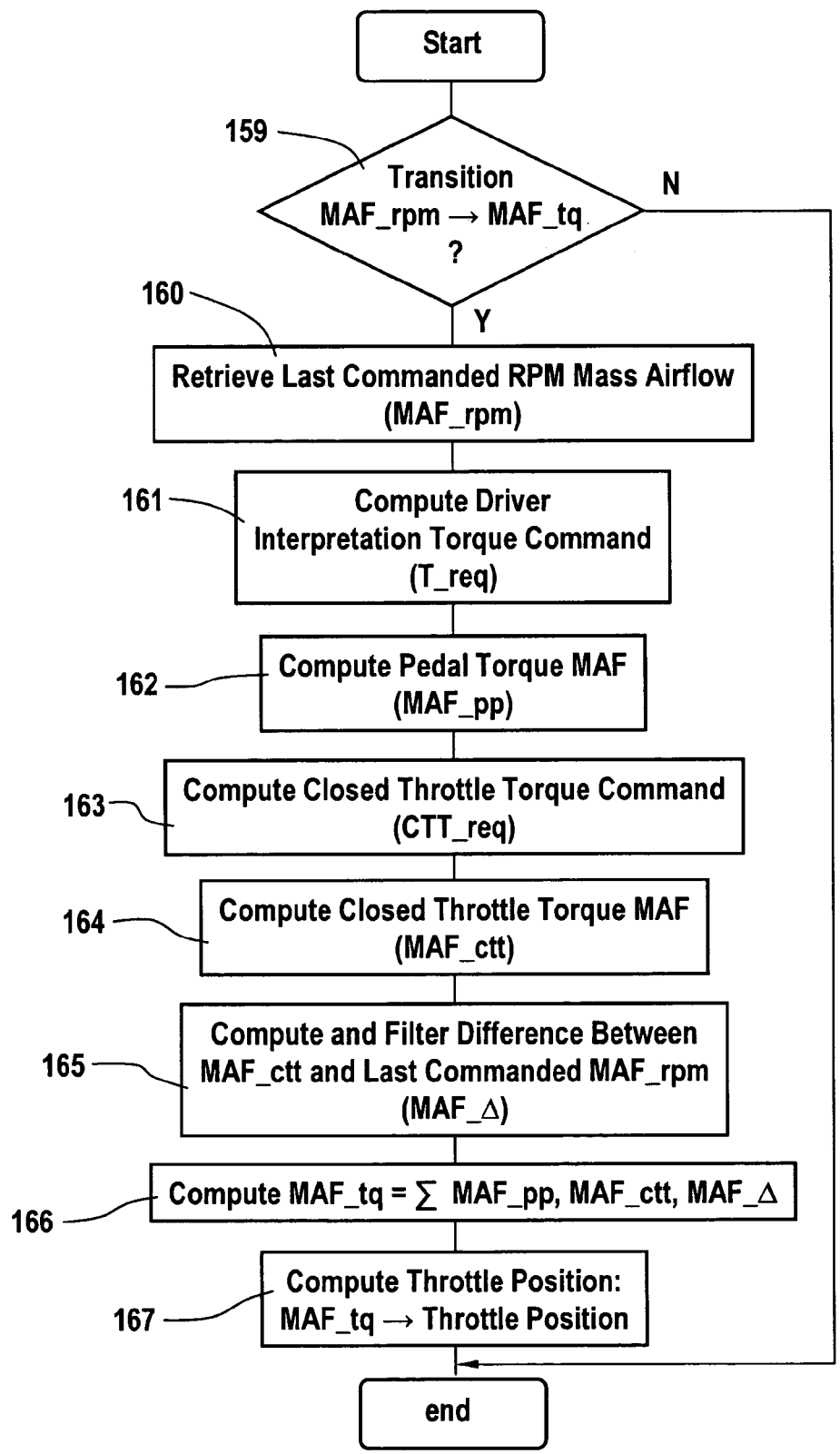
FIG. 5 is a flow chart representing steps carried out in implementing certain RPM mode to torque mode transition control steps of the method of the present invention.

With the preferred control structure having thus been described, a preferred set of steps for execution by PCM 36 for implementing the control of the present invention is illustrated in FIG. 5. The routine is, of course, a sub-set of a much larger set of instructions executed by the PCM 36. The steps are particularly related to an engine control transition from RPM mode control to torque mode control. Preferably, the routine of FIG. 5 is executed periodically on an event basis based on successive engine cylinder events while the engine is operating. It is noted that at the invocation of the present routine, the engine control mode is one of RPM mode control. At step 159 the conditions for invoking transition from RPM mode control to torque mode control are checked (e.g. as determined by mode selection block 111 of FIG. 2) and a decision made whether to initiate a transition and whether the transition is complete as described herein below. If no transition is desired, the routine exits and returns to RPM mode control. A decision to transition results in execution of step 160. At step 160, the last commanded RPM mode mass airflow MAF_rpm is retrieved. At step 161, driver torque request T_req is determined as described with respect to the operator induced throttle pedal position and preselected powertrain operating parameters, e.g. vehicle speed MPH and current transmission ratio GEAR. Step 162 computes from the driver torque request T_req a mass airflow MAF_pp which is an operator requested portion of the torque mode mass airflow. Closed-throttle torque request CTT_req is next determined at step 163 with respect to a substantially closed throttle valve position and preselected powertrain operating parameters, e.g. engine speed RPM and current transmission ratio GEAR. Step 164 computes from the closed-throttle torque request CTT_req a mass airflow MAF_ctt which is the closed throttle portion of the torque mode mass airflow.

An objective in accomplishing a smooth transition is to cause switching of the control at equivalent RPM mode and torque mode mass airflows. During non-transitional periods of torque mode control, torque mode mass airflow can be represented by the following relationship.

$$MAF\_tq = MAF\_pp + MAF\_ctt \qquad (2)$$

It will be appreciated that a fully released throttle pedal would correspond to a substantially null value for MAF_pp and equate the torque mode mass airflow MAF_tq to the closed-throttle mass airflow MAF_ctt. The closed-throttle portion of the torque mode mass airflow MAF_ctt can be compared in function with the last commanded RPM mode mass airflow MAF_rpm. To the extent that there is non-equivalence between MAF_ctt and last commanded MAF_rpm, there can be expected the same degree of discontinuity during transition from RPM mode control to torque mode control. Therefore, the filtered difference between closed-throttle mass airflow MAF_ctt and the last commanded RPM mode mass airflow MAF_rpm is next calculated at step 165 as MAF_Δ. Each successive loop through the routine will result in less contribution from the filtered mass airflow difference resulting in an effective decay of this transitional term. At step 166 the torque mode mass airflow MAF_tq is calculated as the summation of the operator requested portion MAF_pp, the closed-throttle portion MAF_ctt and the transitional portion MAF_Δ.

Step 167 represents determination of the throttle valve position in accordance with the torque mode mass airflow MAF_tq such as described with respect to converter block 103 of FIG. 2. The transition is considered complete essentially when the filtered mass airflow difference MAF_Δ has decayed to substantially zero and the torque mode mass airflow only comprises substantive contributions from the operator requested portion MAF_pp and the closed-throttle portion MAF_ctt.

Figure 6:
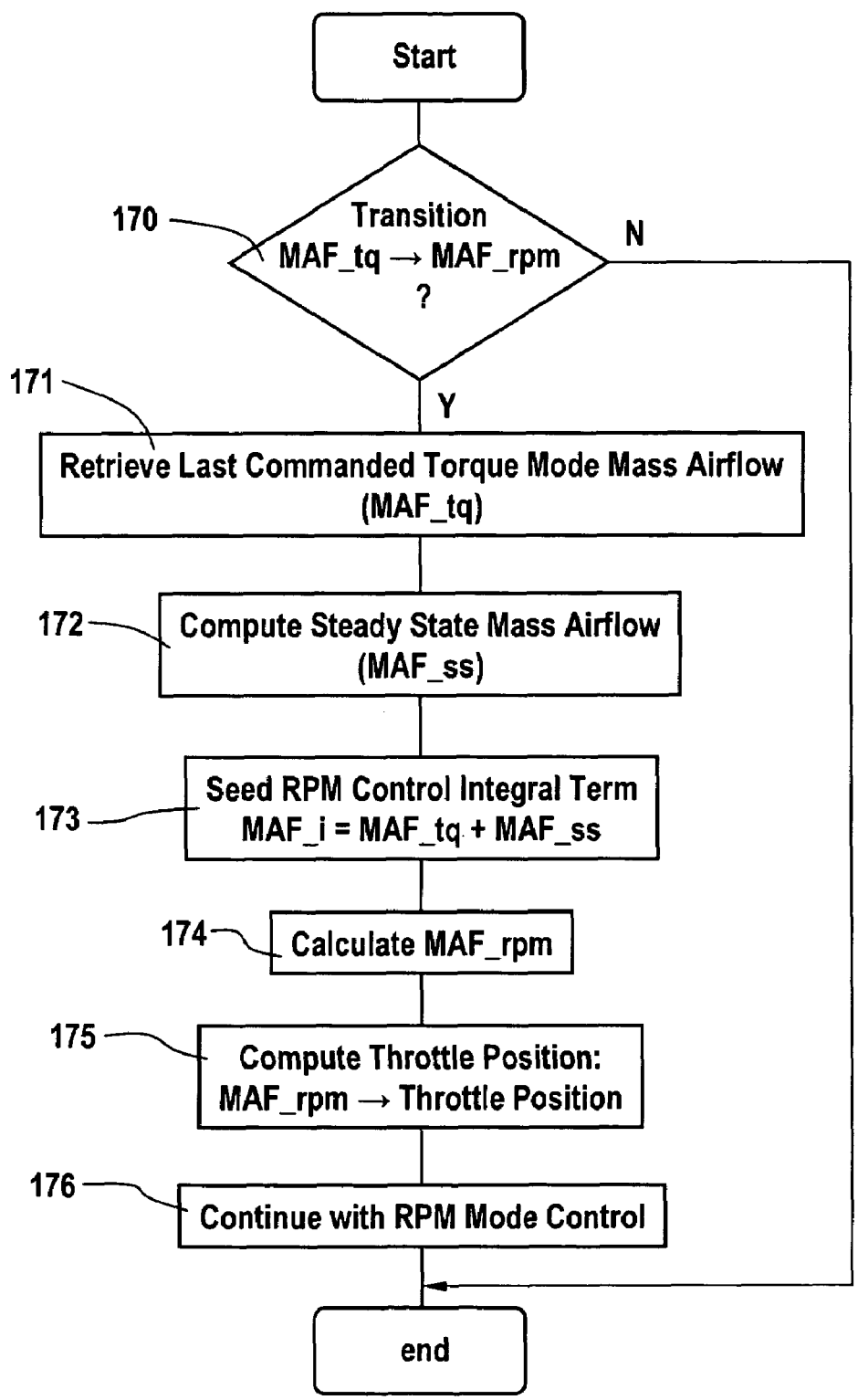
FIG. 6 is a flow chart representing steps carried out in implementing certain torque mode to RPM mode transition control steps of the method of the present invention.

Transition control from torque mode control to RPM mode control can be accomplished in accordance with selectively seeding the closed loop PI RPM control block 125. With reference to FIG. 6, an exemplary set of steps representing instructions for execution by the PCM 36 for carrying out such a transition is illustrated. At step 170 the conditions for invoking transition from torque mode control to RPM mode control are checked (e.g. as determined by mode selection block 111 of FIG. 2) and a decision made whether to initiate a transition. If no transition is desired, the routine exits and returns to the currently active torque mode control. A decision to transition results in execution of step 171. At step 171, the last commanded torque mode mass airflow MAF_tq is retrieved. At step 172, the steady state portion MAF_ss of the closed loop PI RPM control is calculated. Step 173 next calculates the integral portion of the closed loop PI RPM control from the last commanded torque mode mass airflow MAF_tq and the steady state portion MAF_ss of the closed loop PI RPM control. An objective in accomplishing a smooth transition is to cause switching of the control at equivalent RPM mode and torque mode mass airflows. Therefore, in transitioning from torque mode control to RPM mode control, the following relationship is desirably achieved.

$$MAF\_rpm = MAF\_tq \quad (3)$$

From this and the PI control illustrated in of FIG. 4, it can be appreciated that $$MAF\_ss + MAF\_i + MAF\_p = MAF\_tq \quad (4)$$

Ignoring the proportional portion as essentially null prior to invocation of the PI control, the relationship after rearrangement to solve for the integral portion becomes $$MAF\_i = MAF\_tq - MAF\_ss \quad (5)$$

Step 174 represents the determination then of the RPM mode mass airflow MAF_rpm in accordance with the integral portion seed value MAF_i as represented in relationship 4 above the related discussion of its derivation. Next at step 175, determination of the throttle valve position in accordance with the RPM mode mass airflow MAF_rpm is performed such as described with respect to converter block 103 of FIG. 2. The transition is considered complete at this point and subsequent control can be in accordance with RPM mode control as indicated by step 176.

While the invention has been described by reference to certain preferred embodiments, it should be understood that numerous changes could be made within the spirit and scope of the inventive concepts described herein. Accordingly, it is intended that the invention not be limited to the disclosed embodiments, but that it have the full scope permitted by the language of the following claims.

What is claimed is:

1. Method for effecting transitions from an RPM mode control to a torque mode control in an internal combustion engine controller, comprising:
    interpreting an operator invoked torque request into a first mass airflow;
    interpreting a closed-throttle torque request into a second mass airflow;
    determining a third mass airflow required for the engine to produce an output torque effective for maintaining engine speed at a predetermined set speed;
    calculating a mass airflow difference between the second mass airflow and third mass airflow;
    calculating an torque mode mass airflow substantially equivalent to the summation of the first mass airflow, the second mass airflow and the mass airflow difference; and
    switching from an RPM mode control wherein throttle position is determined in accordance with said third mass airflow to a torque mode control wherein throttle position is determined in accordance with said torque mode mass airflow.

2. The method for effecting transitions as claimed in claim 1 wherein interpreting a closed-throttle torque request into a second mass airflow comprises providing the closed-throttle torque request to a torque model comprising torque factors selected from the group consisting of engine speed, spark timing, exhaust gas recirculation, engine temperature, barometric pressure, air/fuel ratio and manifold absolute pressure.

3. The method for effecting transitions as claimed in claim 1 wherein interpreting an operator invoked torque request into a first mass airflow comprises providing the operator invoked torque request to a torque model comprising torque factors selected from the group consisting of engine speed, spark timing, exhaust gas recirculation, engine temperature, barometric pressure, air/fuel ratio and manifold absolute pressure.

4. The method for effecting transitions as claimed in claim 1 wherein said mass airflow difference between the second mass airflow and third mass airflow is decayed.

5. Method for controlling an internal combustion engine including an intake air throttle and an operator controlled throttle pedal with an engine controller in accordance with a torque control term during periods of RPM mode engine operation characterized by a substantially undepressed throttle pedal and during periods of torque mode engine operation characterized by a depressed throttle pedal, comprising:
    providing an RPM mode torque control term to the engine controller and controlling the engine output in accordance therewith during periods of RPM mode engine operation;
    calculating a torque mode torque control term comprising an operator requested portion, a closed-throttle portion and a transitional portion comprising the difference between the closed-throttle portion and the RPM mode torque control term for use in controlling the engine output in accordance therewith during periods of torque mode engine operation; and,
    effecting transitions from periods of RPM mode engine operation to periods of torque mode engine operation by substituting the torque mode torque control term for the RPM mode torque control term in the engine controller, controlling the engine output in accordance with said torque mode torque control term, and gradually reducing said transitional portion of said torque mode torque control term.

6. The method for controlling an internal combustion engine as claimed in claim 5 wherein said torque control terms correspond to mass airflow through the internal combustion engine.

7. The method for controlling an internal combustion engine as claimed in claim 5 further comprising effecting transitions from periods of torque mode engine operation to periods of RPM mode engine operation by initializing the RPM mode torque control term to substantially equate to the torque mode torque control term and thereafter substituting the RPM mode torque control term for the torque mode torque control term in the engine controller and controlling the engine output in accordance therewith.

8. The method for controlling an internal combustion engine as claimed in claim 7 wherein said RPM mode torque control term is provided in accordance with an engine speed control comprising an integral error quantity and initializing the RPM mode torque control term to substantially equate to the torque mode torque control term comprises seeding the integral error quantity with an initial value.

9. Article of manufacture comprising:
a storage medium having a computer program encoded therein for controlling an internal combustion engine including an intake air throttle and an operator controlled throttle pedal with an engine controller in accordance with a torque control term during periods of RPM mode engine operation characterized by a substantially undepressed throttle pedal and during periods of torque mode engine operation characterized by a depressed throttle pedal, said program including:
code for providing an RPM mode torque control term;
code for controlling the engine output in accordance with said RPM mode torque control term during periods of RPM mode engine operation;
code for calculating a torque mode torque control term comprising an operator requested portion, a closed-throttle portion and a transitional portion comprising the difference between the closed-throttle portion and the RPM mode torque control term; and,
code for transitioning control from periods of RPM mode engine operation to periods of torque mode engine operation by substituting the torque mode torque control term for the RPM mode torque control term in the engine controller, controlling the engine output in accordance with said torque mode torque control term, and gradually reducing said transitional portion of said torque mode torque control term.

10. The article of manufacture as claimed in claim 9 wherein said code for providing an RPM mode torque control term comprises:
code for resolving a desired engine set speed into a desired mass airflow sufficient for the engine to produce an output torque effective for maintaining engine speed at said desired set speed.

11. The article of manufacture as claimed in claim 9 wherein said code for calculating a torque mode torque control term comprises:

code for resolving predetermined powertrain operating parameters and throttle pedal position into an operator torque request;
code for resolving said operator torque request and preselected engine operating parameters into a first torque control term;
code for resolving predetermined powertrain operating parameters into a closed-throttle torque request;
code for resolving said closed-throttle torque request and preselected engine operating parameters into a second torque control term;
code for calculating a difference between the second torque control term and the RPM mode torque control term; and
code for summing the first torque control term, the second torque control term and the difference between the second torque control term and the RPM mode torque control term to provide the torque mode torque control term.

12. The article of manufacture as claimed in claim 9 wherein said RPM mode torque control term comprises an RPM mode mass airflow and said code for calculating a torque mode torque control term comprises:
code for resolving predetermined powertrain operating parameters and throttle pedal position into an operator torque request;
code for resolving said operator torque request and preselected engine operating parameters into a first mass airflow;
code for resolving predetermined powertrain operating parameters into a closed-throttle torque request;
code for resolving said closed-throttle torque request and preselected engine operating parameters into a second mass airflow;
code for calculating a mass airflow difference between the second mass airflow and the RPM mode mass airflow; and
code for summing the first mass airflow, the second mass airflow and the mass airflow difference to provide the torque mode torque control term.

* * * * *